Figure 1:
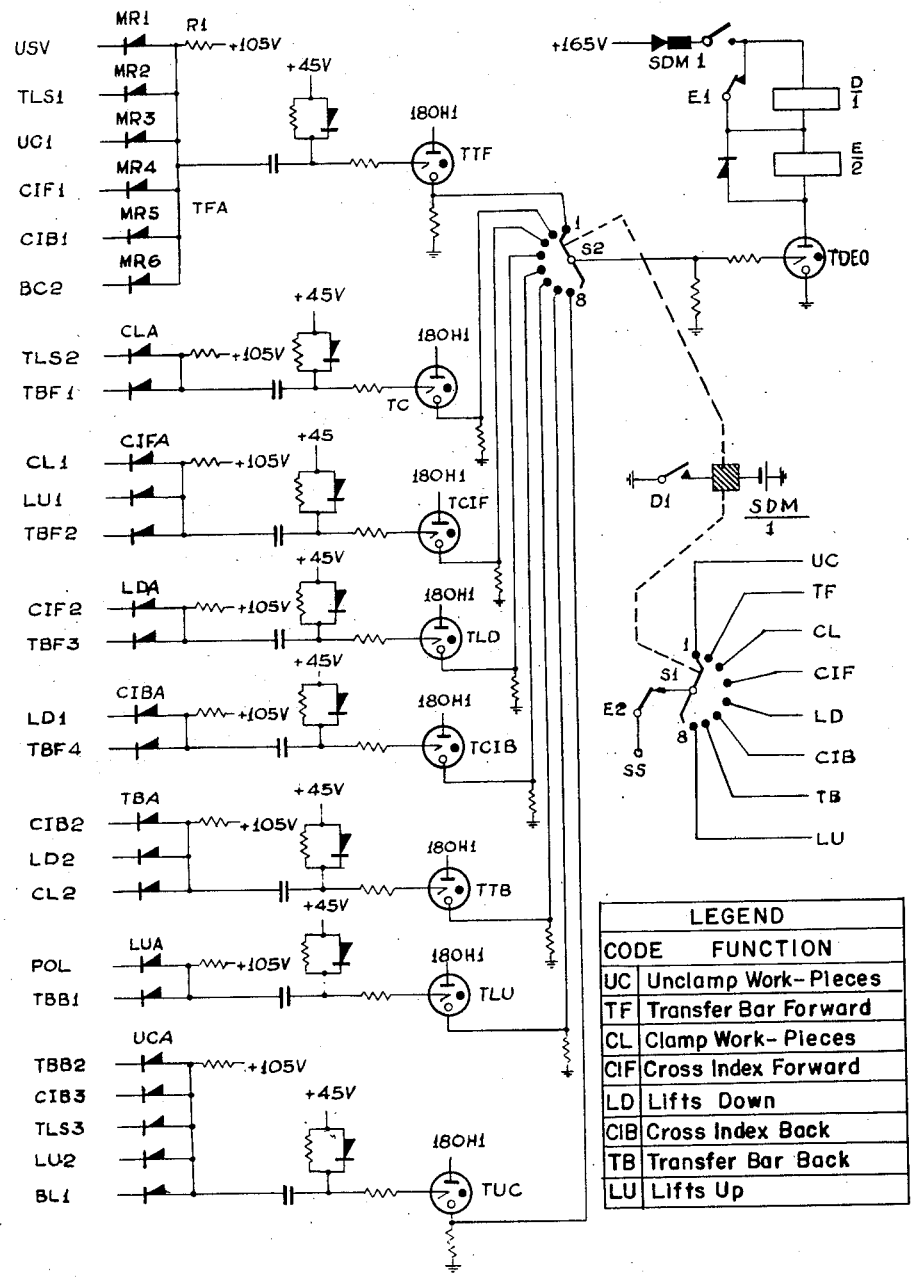

INVENTORS
FRANK WILLIAM WOOTTON HIGHFIELD
RICHARD WILLIAM BRIERLEY
BY Irwin S. Thompson
ATTY.

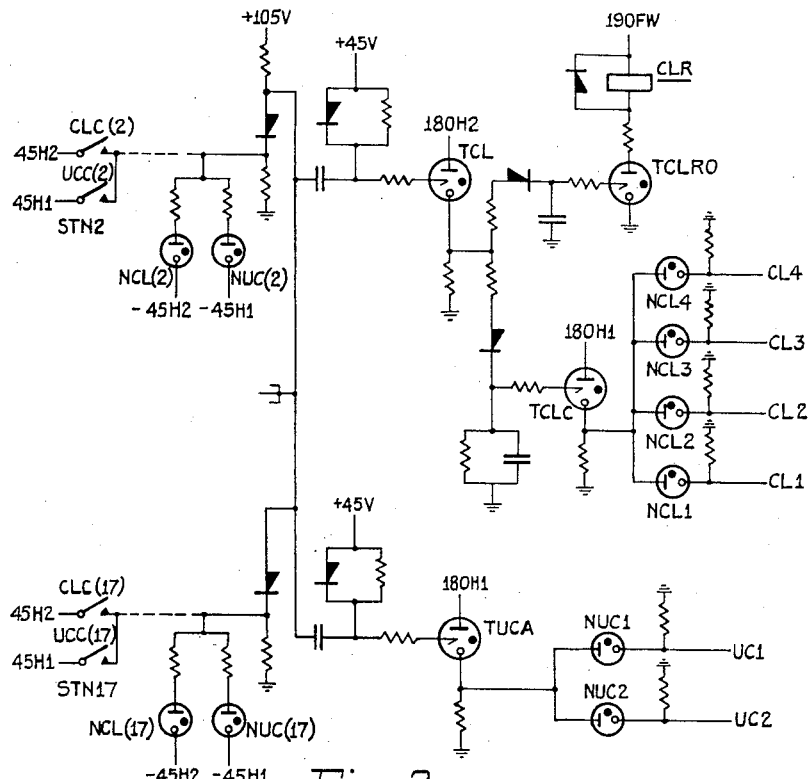
Fig. 3
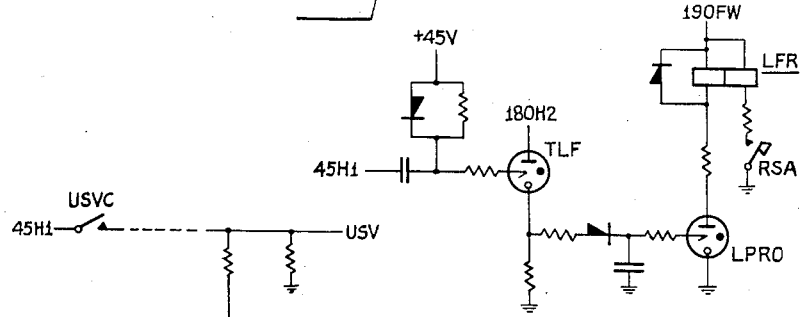
Fig. 4
Fig. 5
INVENTORS
FRANK WILLIAM WOOTTON
HIGHFIELD
RICHARD WILLIAM BRIERLEY
BY 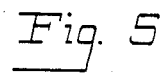
ATTY.

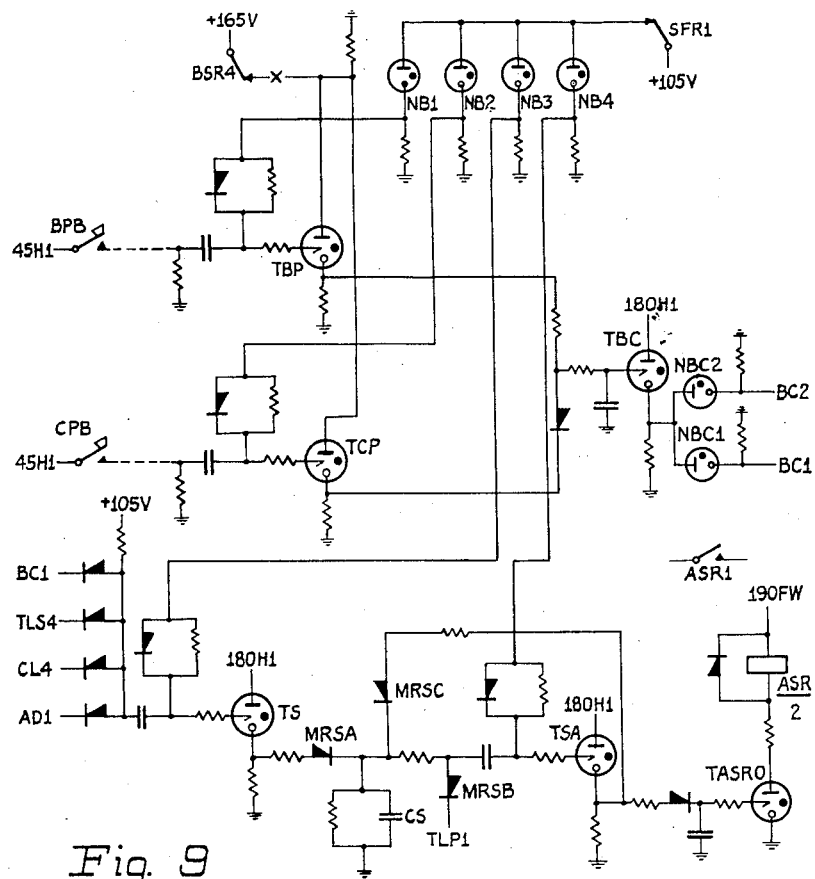
Fig. 9
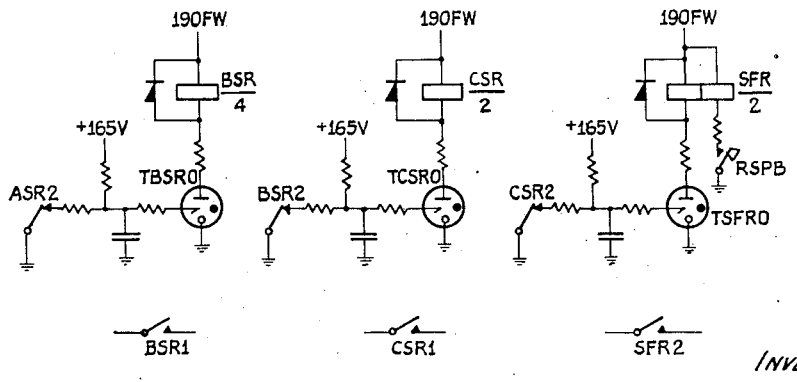
INVENTORS
FRANK WILLIAM WOOTTON HIGHFIELD
RICHARD WILLIAM BRIERLEY
BY Irwin S. Thompson
ATTY.

United States Patent Office 3,037,607
Patented June 5, 1962

3,037,607
ELECTRICAL SIGNALLING CIRCUITS SUITABLE FOR THE AUTOMATIC CONTROL OF MACHINING OPERATIONS
Frank William Wootton Highfield and Richard William Brierley, Longbridge, Birmingham, England, assignors to The Austin Motor Company Limited, Longbridge, England, and Hivac Limited, South Ruislip, England, both British companies
Filed Dec. 23, 1958, Ser. No. 782,574
Claims priority, application Great Britain Jan. 3, 1958
12 Claims. (Cl. 198—19)

The present invention relates to electrical signalling circuits suitable for the automatic control of successive machining or other operations on a work-piece but not necessarily limited thereto. Preferably, use is made of cold-cathode gas-discharge tubes in order to reduce the cost and size of the equipment.

In the manufacture of products which require to have a considerable number of successive machining operations, such as milling, grinding, drilling and tapping, performed upon them, the use of automatic transfer machines is well known. These machines are often of great size and take the form of a linear conveyor by which the work-pieces, generally secured to individual platens or base-plates, are advanced step-wise through different machining stations located successively along the transfer machine. A typical transfer machine may have eighteen stations along its length, the first and last stations being the loading and unloading stations respectively, with possibly automatic lifts and cross-index arrangements adjacent to them, while the remainder are relevant to the various automatically controlled machine-tools each of which is arranged to perform a distinct machining operation upon the work-pieces traversing the bed of the transfer machine. Typically, at an appropriate time, when a finished work-piece has been unloaded from the associated platen, the unload cross-index mechanism moves this platen on to the raised lift whereafter it is lowered to a conveyor track more or less at floor level. This conveyor then returns the platen to the lift at the loading station of the machine where it is subsequently raised and cross-indexed in readiness for the loading of a further work-piece.

Clamping arrangements are provided at each of the machining stations whereby work-pieces occupying the successive stations are secured accurately in stationary position, usually through the intermediary of the platens, for an interval during which the work-pieces are machined, each according to the station which it occupies. When a period of machining has been completed, and conditional upon various other essential requirements having been met, the work-pieces are unclamped and subsequently transferred forwardly one position along the bed of the transfer machine. Thus the completed work-piece which occupied the last machining station is transferred to the now vacant unloading station, those work-pieces which have been machined to varying degrees are advanced one step to succeeding machining stations and that workpiece which occupied the loading station is transferred to the second station at which the first machining operation is to be performed.

The transfer function of the machine is effected by the forward movement of a so-called transfer bar having a reciprocating action which may be controlled for instance by hydraulic means. This bar is provided with dogs or the like to engage the various platens and move them forward.

An automatic transfer machine of the type outlined, which is to perform sequences of operations, requires an adequate signalling and control system and to this end signalling devices, for instance limit switches, are provided at essential signalling points of the transfer machine and the allied lifts and machine tools, and are arranged to be controlled according to the conditions prevailing at such points. The information received at a central control point is assessed and correlated to enable the appropriate operation in the sequence to be effected.

The chief object of the present invention is to provide an improved electrical signalling and control system suitable for such a machine which is reliable in operation, is relatively economical in cabling from the signalling points, and which also includes a central display for monitoring or supervisory purposes.

According to one feature of the invention, in an electrical signalling and control system a plurality of signalling points connected in pairs over single conductors respectively to responding circuits so as to control the operation of a sequence control circuit are provided with switching means for the transmission of half-wave pulsating signals to the responding circuits alternatively of said one phase and of the complementary phase according to which signalling point of the pair is concerned.

The nature of the invention will be better understood from the following description of a typical embodiment concerned in the control of an automatic transfer machine, and this should be read in conjunction with the accompanying drawings comprising conventional circuit diagrams.

Figure 2:
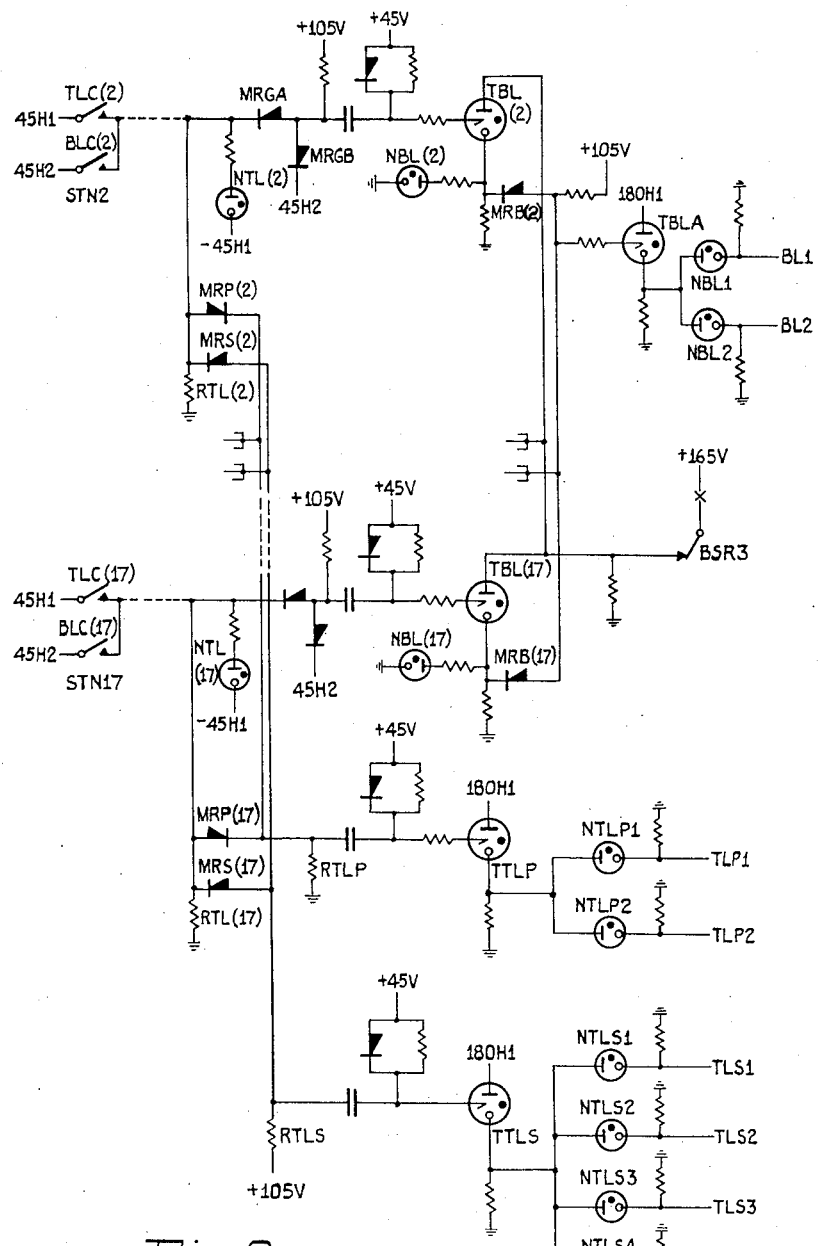
Figure 6:
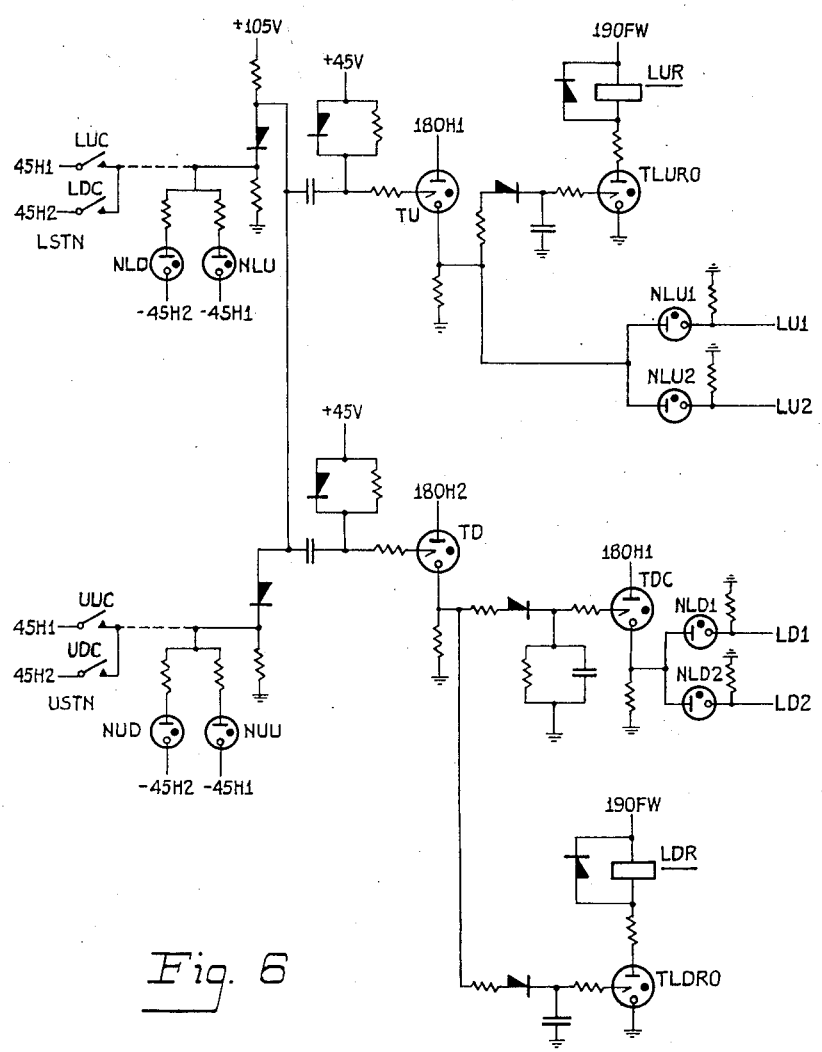
Figure 7:
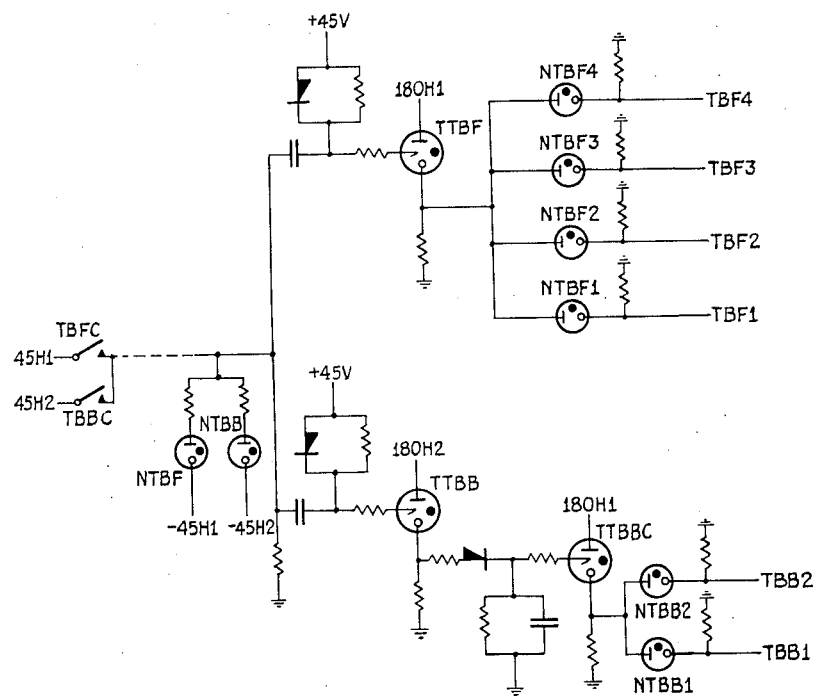
Figure 8B:
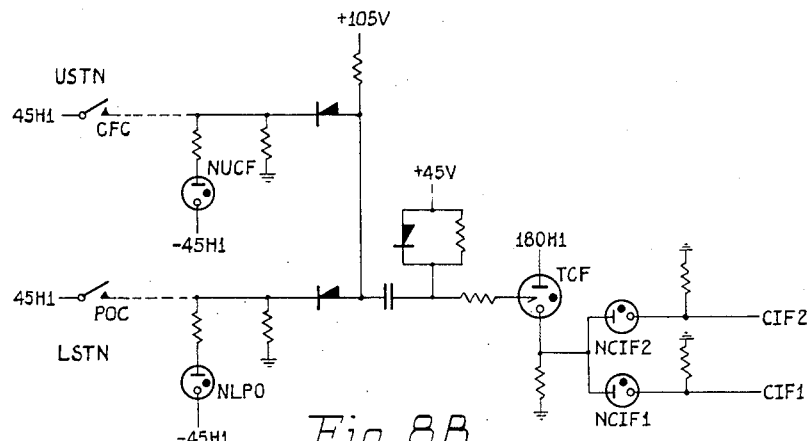
Figure 8A:
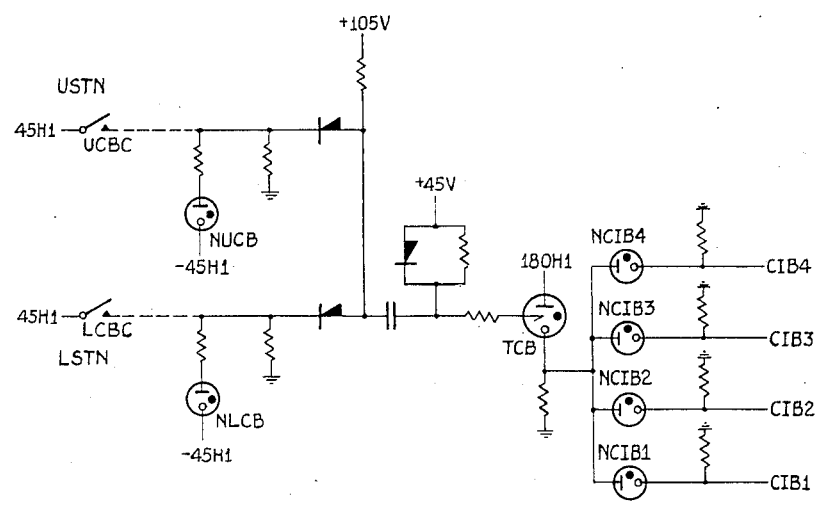
Figure 10:
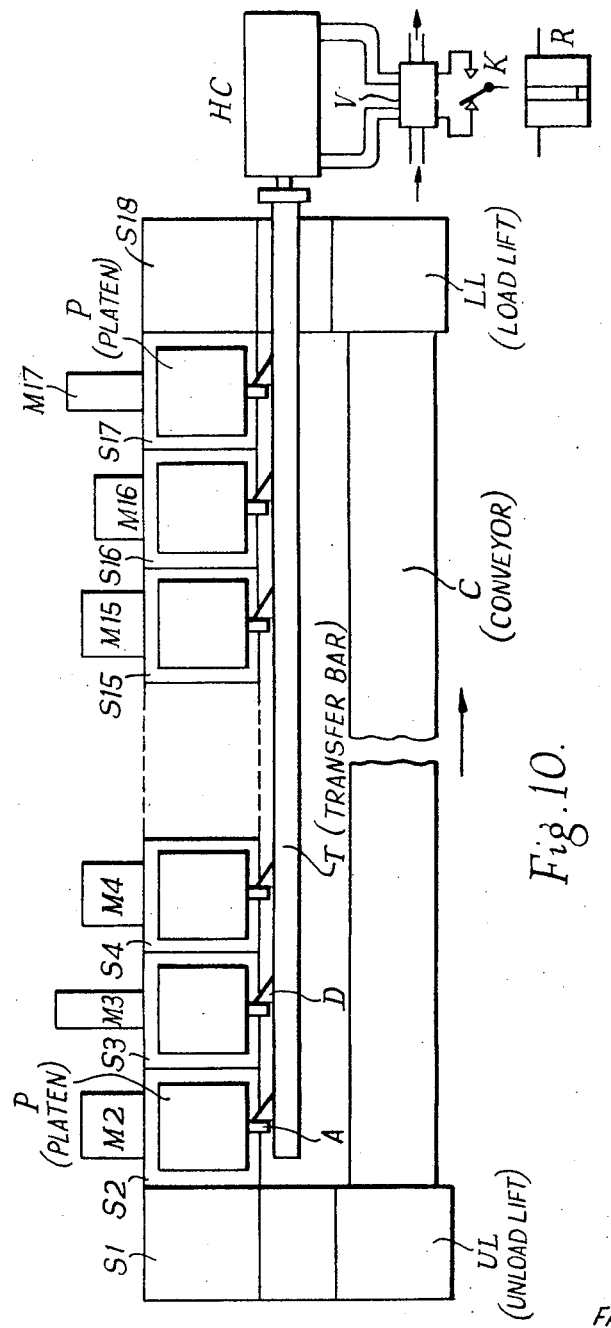

Of the drawings, FIG. 1 is the sequence control circuit for the transfer machine; FIG. 2 is the top and bottom limit signalling circuit relevant to machine-tool heads; FIG. 3 is the clamp and unclamp signalling circuit; FIG. 4 is a circuit responsive to a signal produced when the unload station is vacant and is typical of other circuits, one of which, for instance, would be concerned with a signal indicating that an empty platen is on the loading lift; FIG. 5 is a fault responsive circuit; FIG. 6 is the lifts signalling circuit; FIG. 7 is the transfer-bar signalling circuit; FIGS. 8A and 8B are the cross-index signalling circuits; FIG. 9 is the start circuit and FIG. 10 shows diagrammatically the general layout of the transfer machine.

Before a detailed description of the circuits is given, some understanding of the various electrical supplies used will be necessary. Generally, the value of potentials will be referred to with respect to earth. Certain supplies are derived from the 50 c.p.s. single-phase alternating current mains. Thus leads designated 190FW, FIGS. 3, 5 and 6, are fed with a full-wave rectified supply in which each half cycle attains a peak of +190 v. Half-wave rectified supplies are also used, and in this respect leads carrying the reference suffix H1 receive half-wave rectified supplies of one phase whereas the half-wave pulses fed to those leads having the reference suffix H2 are displaced 180° with respect to those just mentioned. Supplies designated 45H1 and 180H1 are therefore pulsating sources of one phase in which the pulses attain peaks respectively of 45 v. and 180 v. positive with reference to earth and those leads designated —45H1 receive pulsating supplies of the same phase but with peaks at 45 v. negative with respect to earth. The other pulsating supplies which are referred to as 45H2, 180H2 and —45H2 correspond in value to those mentioned above respectively, but it will be understood that pulses occur in the complementary periods.

The use of phase-displaced supplies as outlined is of advantage since it permits the alternative transmission of two phase-displaced signalling conditions over a single conductor from a remote signalling point to the centralised control panel where the transmitted signal would be operative upon the appropriate one of two phase-conscious signalling tubes acting say as pulse repeaters, and possibly upon one of a pair of phase-conscious indicator tubes.

All the tubes appearing in the circuits are of the cold-cathode gas-discharge type. Moreover, the conductors connecting the signalling points to the centralised electrical responding and control equipment are represented in the drawings by broken lines. The equipment also includes a common display panel for visual supervision purposes.

FIG. 10 shows in a very diagrammatic manner the general layout of the transfer machine. As subsequently explained in greater detail, it is assumed that this comprises 18 stations, 16 of which are used for machining operations while the remaining 2 comprise the loading and unloading positions. These stations S1—S18 are located on a long main bed and the machining stations are provided respectively with unit head machine tools M2—M17. These tools are preferably arranged so that they can be operated at any angle as required by the nature of the work and means may also be provided, though they are not shown in the diagram, for reversing or turning over the workpieces as they pass along the transfer machine. It is assumed that S18 is the loading station and S1 the unloading station so that the workpieces, each secured to a platen P, pass along the transfer machine from right to left. The movement is effected by means of a transfer bar T which can be operated by means of a hydraulic cylinder HC to which suitable fluid under pressure is supplied at opposite ends under the control of the valve V. This is indicated as being of the electromagnetically-operated type as controlled by the contacts K of a relay R. The transfer bar is provided with dogs D which engage with projections A on the various platens. When hydraulic fluid is admitted to the right hand end of the cylinder HC, the transfer bar is moved forward, i.e. to the left, and by means of the dogs D advances all the platens one step. It is assumed that the dogs are pivoted under spring control so that when the transfer bar T is subsequently retracted by admission of hydraulic fluid to the left hand end of cylinder HC, due to the changeover of contacts K, these dogs clear the projections A on the platens and subsequently engage with the projections on the platens in the next position in readiness for a further transfer operation. The lifts are indicated at LL and UL and they are associated with stations S18 and S1 respectively by cross indexing mechanism not shown. As already described it is assumed that the platens are returned from one end of the transfer machine to the other by means of the conveyor C which is on a lower level. The means for clamping the platens during the machining operations have not been indicated.

*Sequence Control Circuit (FIG. 1).*—The various functions of the transfer machine are ultimately controlled by this circuit which incorporates a uniselector, of the forwardly acting type, having two contact levels S1 and S2. For convenience the uniselector is represented as having eight wiper positions, but in practice a conventional 25-point bank would be employed with suitable multipling to provide three suitably spaced appearances of each of the required eight outlets. Wiper S1 of the uniselector is concerned with completing electrical paths, from a suitable supply SS, individually and successively over eight leads UC, TF, CL, CIF, LD, CIB, TB and LU which would be terminated on relay devices adapted to actuate hydraulic control equipments performing various functions relevant to the transfer machine.

The effect of energising the leads as regards initiating a function of the transfer machine is set forth in the following table:

| Uniselector contact | Lead energised | Machine function |
| --- | --- | --- |
| 1 | UC | Unclamp work-pieces. |
| 2 | TF | Transfer bar forward to advance work-pieces one station. |
| 3 | CL | Clamp work-pieces. |
| 4 | CIF | Cross index forward (empty platen moved from loading lift to loading station and unloaded platen moved from unloading station to lift). |
| 5 | LD | Lifts down. |
| 6 | CIB | Cross index mechanisms back. |
| 7 | TB | Transfer bar back. |
| 8 | LU | Lifts up. |

Accordingly, with the uniselector wipers in the position shown it may be taken that the work-pieces have been unclamped as a result of lead UC being energised from the supply source SS by way of relay contacts E2 and wiper S1.

Before the uniselector can be advanced to the next position so as to initiate the transfer forward function of the machine it is necessary to fire tube TTF. This tube is normally primed by the application to the trigger or control electrode of +45 v. derived over a resistor and rectifier in parallel, the rectifier providing a leakage path for any negative potentials occurring in the trigger circuit.

The firing of tube TTF is controlled by a well-known form of AND or coincidence circuit TFA comprising rectifiers MR1 to MR6 and resistor R1, the latter being fed by +105 v. Six signal input leads, USV, TLS1, UC1, CIF1, CIB1 and BC2, are concerned in the AND circuit, each lead in the quiescent state having a resistance to earth condition upon it, which is replaced by a pulsating signal of phase H1 under the appropriate conditions, the pulses being positive-going and rising from earth. It is to be noted that the input signals of the AND circuit are in phase with the half-cycle wave form constituting the anode supply of the pulse-repeating tube TTF.

When any one or more of the signalling leads USV to BC2 are in the quiescent condition, the potential at the common point remains substantially constant at some point intermediate +105 v. and earth. However, as soon as pulsating signals occur on all leads, the potential at said point varies with the concurrent signals and corresponding pulses are applied over a capacitor and resistor to the trigger of tube TTF. Whilst this condition persists, tube TTF fires for a portion of each pulse of the 180H1 supply and pulses from its cathode and extending over uniselector level S2 are applied to the trigger of tube TDEO, which has +165 v. connected to its anode over the uniselector interrupter contacts SDM1, contacts E1 and relay E. Tube TDEO therefore conducts continuously and relay E operates, whereupon contacts E2 disconnect wiper S1 to prevent arcing when the uniselector steps. Simultaneously contacts E1 open to cause relay D to operate to the anode current of tube TDEO and, at contacts D1, energise the uniselector magnet SDM to advance the wipers to position 2. The interrupter contacts SDM1 operate towards the end of the forward stroke of the uniselector armature to disconnect the anode of tube TDEO.

With the uniselector wipers at position 2, wiper S1 prepares a path to lead TF of the hydraulic control equipment, and wiper S2 connects the trigger of the tube TDE0 to the cathode of tube TC which is associated with the second AND circuit CLA. By this time, tube TDE0 has extinguished and relays D and E consequently release, the release of relay E being slightly delayed due to the rectifier shunting its winding. Upon the release of relay D, the uniselector magnet is de-energised, and the release of relay E is effective in connecting the supply source SS to lead TF of the hydraulic control equipment whereby the transfer bar of the machine is moved forwardly to effect transfer of the work-pieces.

Referring back to the six input signal leads of the AND circuit TFA which were concerned in instituting the transfer forward function, it will be appreciated that the presence of the phase H1 signalling condition on all the leads was indicative of the fact that the operative condition of the transfer machine was such that the forward transfer function could be instituted. The signals are derived from various other circuits to be described and the following table outlines the circumstances which produce the signalling condition on any particular lead, the circuits involved being mentioned:

| Lead | From | Significance of signal |
|---|---|---|
| USV | Fig. 4 | Unload station vacant. |
| TLS1 | Fig. 2 | All machine tool heads clear of work-pieces, relevant top limit switches all being operated. |
| UC1 | Fig. 3 | Work-pieces unclamped. |
| CIF1 | Fig. 8B | Unloaded platen on raised unloading lift, and a loaded platen on load station. |
| CIB1 | Fig. 8A | Cross-index mechanisms back. |
| BC2 | Fig. 9 | Machine operators (B and C) at loading and unloading stations have completed loading and unloading the platens respectively and have each operated a push button to signify this. |

Seven other AND circuits similar to that described are concerned in the controlled stepping of the uniselector S, the number of input leads for the respective circuits being dependent upon the number of coincidental conditions which are required to effect the appropriate operative function of the transfer machine.

These AND circuits designated CLA, CIFA, LDA, CIBA, TBA, LUA and UCA, which are to be operative in that order, are associated with pulse-repeating tubes TC, TCIF, TLD, TCIB, TTB, TLU and TUC respectively after the manner of that already described. The tubes have their cathodes connected to contacts 2 to 8 respectively of uniselector level S2.

The concurrent appearance of phase H1 signalling conditions at any group signal input leads is effective in firing the relevant pulse-repeating tube to the 180H1 anode supply, and this results in the firing of tube TDE0 if wiper S2 is positioned to connect with the tube trigger electrode. In all such cases the response of relays D and E causes the uniselector to advance one step as described, to initiate the requisite function of the transfer machine.

A perusal of the sequence control circuit FIG. 1 shows that each of the remaining AND circuits is operative along the lines already described and it can be deduced that the various functions of the transfer machine will be brought into effect in repetitive sequence.

The significance of signalling leads of the remaining AND circuits is listed below:

| AND circuit and function | Lead | Significance of signal |
|---|---|---|
| CLA—Clamp | TLS2 (Fig. 2) | All machine-tool heads clear. |
| | TBF1 (Fig. 7) | Transfer bar forward. |
| | CL1 (Fig. 3) | Work-pieces in machining stations clamped. |
| CIFA—Cross index. | LU1 (Fig. 6) | Lifts up. |
| | TBF2 (Fig. 7) | Transfer bar forward. |
| | CIF2 (Fig. 8B) | Cross-index forward at load and unload stations. |
| LDA—Lifts down. | TBF3 (Fig. 7) | Transfer bar forward. |
| | LD1 (Fig. 6) | Loading and unloading lifts in the down position. |
| CIBA—Cross index back. | TBF4 (Fig. 7) | Transfer bar forward. |
| | CIB2 (Fig. 8A) | Cross index mechanisms back. |
| TBA—Transfer back. | LD2 (Fig. 6) | Lifts down. |
| | CL2 (Fig. 3) | Work-pieces clamped. |
| | POL, (similar to Fig. 4). | Platen on lowered loading lift. |
| LUA—Lifts up | TBB1 (Fig. 7) | Transfer bar back. |
| | TBB2 (Fig. 7) | Do. |
| | CIB3 (Fig. 8A) | Cross index mechanisms back. |
| | TLS3 (Fig. 2) | All machine-tool heads clear. |
| UCA—Unclamp | LU2 (Fig. 6) | Lifts up. |
| | BL1 (Fig. 2) | All machine-tool heads have machined to set depth, operating the relevant bottom limits. |

*Top and Bottom Limits Signalling Circuit (FIG. 2).—*
This is controlled from so-called limit switches operable according to the positions of the machining heads of the various machine tools with respect to the work-pieces. It is assumed that sixteen machining stations, namely stations STN2 to STN17, are provided and for simplicity only the circuit elements for stations STN2 and STN17 are shown. The relationship of various circuit components to particular stations is signified by the inclusion of the bracketed number in the references.

Each station has a pair of make contact units i.e. limit switches, TLC(2), BLC(2) ... TLC(17), BLC(17), the first mentioned of each pair, which are supplied from pulsating source 45H1, being closed when the relevant machining head is clear of a work-piece (i.e. top limit switch operated) whereas the second contact unit, supplied from source 45H2, is closed when the relevant head has machined to its set depth (i.e. bottom limit switch operated).

With the various contacts in the state shown a resistance earth condition is applied to the output signalling leads BL1, BL2, TLP1, and TLP2 and TLS1 to TLS4, none of the tubes being fired.

Each pair of contacts units TLC(2), BLC(2) ... TLC(17), BLC(17) extends over its individual signalling conductor to an AND circuit comprising rectifiers MRS(2) to MRS(17) together with resistor RTLS, and to an OR circuit comprising rectifiers MRP(2) to MRP(17) and resistor RTLP. Moreover, each pair of contacts extends to an individual diode tube NTL(2) ... NTL(17) and to individual circuit elements involving a tube such as TBL(2) or TBL(17).

When any one or more of the top-limit contacts TLC(2) to TLC(17) are open, the relevant ones of rectifiers MRS(2) to MRS(17) are conducting due to +105 v. at the common resistor RTLS and earth at the individual resistors RTL(2) to RTL(17). Accordingly no effective phase H1 signalling condition is present in the trigger circuit of pulse-repeating tube TTLS. However, the closure of any contact unit TLC(2) ... TLC(17) causes the related diode tube, each having its cathode connected to supply —45H1, to fire so that a visual indication of the state of the individual contacts is presented on the display panel. Only when all the TLC contacts are closed, indicating that all the machine tool heads are withdrawn from the work-pieces, is a pulsating 45H1 signal extended over a capacitor to the trigger of tube TTLS. This tube having supply 180H1 at its anode, and being primed by +45 v. to the trigger is sensitive to the applied 45H1 signal. Therefore tube TTLS is now fired at the signal frequency and corresponding positive pulses are obtained from the cathode. These pulses extend to the anodes of diode tubes NTLS1 to NTLS4 and effect firing of these tubes. Positive pulses in phase with the 45H1 supply are accordingly applied to leads TLS1 to TLS4 of which the first three extend to corresponding leads of the sequence control circuit (FIG. 1), whereas lead TLS4 extends to the start circuit (FIG. 9). The diode tubes provide the necessary isolation of the leads.

The well-known type of OR circuit comprising rectifiers MRP(2) to MRP(17) converging on the earthed resistor RTLP is operative in extending a 45H1 pulsating signal over a capacitor to the trigger circuit of tube TTLP when any one or more of the top-limit contacts TLC(2) to TLC(17) is in the operated condition (i.e. when any of the machine-tool heads is in the withdrawn state). Tube TTLP has its trigger primed in a like manner to tube TTLS and similarly has its anode supplied from the 180H1 source so as to be sensitive only to 45H1 positive pulses extended to the trigger circuit. In the circumstances outlined, tube TTLP fires repetitively, and the consequent positive pulses at its cathode cause the isolating diode tubes NTLP1 and NTLP2 to fire in sympathy so that pulsating signals corresponding in phase and polarity with supply 45H1 are produced at leads TLP1 and TLP2. The first of these leads terminates upon the start circuit (FIG. 9) whereas the other lead is spare.

It is to be noted that contacts BLC(2) . . . BLC(17) will be effective on the AND and OR circuits in precisely the same manner as contacts TLC(2) . . . TLC(17), and pulsating 45H2 signals from them are extended to the triggers of tubes TTLP and TTLS. However, the anode supplies, 180H1, render the tubes "phase conscious" as regards the trigger input, and therefore the tubes remain inoperative.

FIG. 2 also shows a gating circuit comprising a pair of rectifiers such as MRGA and MRGB which is associated with each pair of signalling contacts, the negative plates of the rectifiers being associated with the trigger of a tube TBL(2) . . . TBL(17) and extending over a resistor to the +105 v. supply, whereas the positive plate of rectifier MRGB is connected to the pulsating source 45H2. With the signalling contacts, for instance TLC(2) and BLC(2), in the condition shown, rectifier MRGA is in the low resistance condition due to earthed resistor RTL(2). Therefore no effective pulsating signals are evident at the junction of the rectifiers, and this also applies when a 45H1 signal is connected to the positive plate of rectifier MRGA, due to the complementary effects of the two rectifiers.

However, when the machine-tool head of the appropriate station has machined to its set depth, the relevant contacts, e.g. contacts BLC(2), are closed and thereupon, during the earth periods of the 45H2 pulsating supply the current through rectifiers MRGA and MRGB is a maximum, whereas during the half-cycle positive pulse periods the current is reduced so that positive pulses corresponding to those of source 45H2 are extended over a capacitor and resistor to the trigger of tube TBL(2). This tube like the other similar tubes, is primed by +45 v. by way of the parallel resistor/rectifier network, and derives its +165 v. anode potential from a common path involving relay contacts BSR3 and other contacts signified by the X. This path is connected to earth by way of a resistor for contact wetting purposes. Tube TBL(2) is fired when contacts BLC(2) are closed and remains conducting until relay BSR in the start circuit is duly operated and this will occur when the machining of all the clamped work-pieces has been completed.

The bottom-limit contacts BLC(3) to BLC(17) are operative, when closed, in initiating the conduction of the relevant tubes TBL(3) to TBL(17) after the manner of tube TBL(2), the tubes remaining fired regardless of said contacts until the anode supply is disconnected by contacts BSR3. It will now be understood that the tubes act as memory devices. Each of these tubes, like tube TBL(2), fires the attendant indicator diode such as NBL(2) and NBL(17) to provide an indication upon the common display panel to the effect that the relevant bottom-limit contact has been closed.

Rectifiers MRB(2) . . . MRB(17), connecting individually to the earthed cathode resistors of tubes TBL(2) . . . TBL(17), form another AND or coincidence circuit in conjunction with a common resistor connected to +105 v. When all said tubes have been rendered conducting, the AND circuit produces a high positive potential at the trigger of the pulse generating tube TBLA and as a result of this, the main gap is fired during the peak periods of the 180H1 anode supply. Accordingly the isolating diode tubes NBL1 and NBL2 fire repetitively to produce positive pulses of phase H1 at the signalling leads BL1 and BL2. Lead BL1 is connected to the sequence control circuit (FIG. 1), whereas the lead BL2 is spare.

When tubes TBL(2) to TBL(17) are duly extinguished by disconnection of the anode supply, the indicator diodes cease firing, and tube TBL and its attendant diodes are also extinguished, whereupon leads BL1 and BL2 revert to the resistance earth condition.

*Clamp and Unclamp Signalling Circuit (FIG. 3).*—The purpose of the circuit is to institute pulsating positive signals of phase H1 on leads CL1 to CL4 when all the clamping mechanisms for the machining stations of the transfer machine are indicated as operative, and at leads UC1 and UC2 when all the mechanisms are released. Leads CL1, CL2 and UC1 extend to the sequence control circuit (FIG. 1) whereas lead CL4 extends to the start circuit (FIG. 9), the remaining leads being spare.

Each of the sixteen machining stations which are represented as regards the present facilities by stations STN2 and STN17, is provided with a pair of contact units CLC(2), UCC(2) . . . CLC(17), UCC(17). The first of each pair, supplied from pulsating source 45H2 is closed when the relevant clamping facility is operative, and the second of each pair, supplied from source 45H1, is closed when the appropriate work-piece is unclamped. Each pair of contacts is connected over a single conductor to the control equipment, each such conductor being terminated upon a separate earthed resistor and a rectifier forming an AND circuit, and extending over resistors to the anodes of two indicator diodes NCL(2), NUC(2) . . . NCL(17), NUC(17). The pairs of diode tubes are mounted on the common display panel and serve to provide for visual monitoring of the state of the signalling contacts. In the AND circuit, the common point of the rectifiers and the resistor, which is supplied with +105 v., extends over separate capacitors to the trigger circuit of tubes TCL and TUCA. Both tubes are primed by +45 v. connected over resistor/rectifier networks to the triggers, and the presence of pulsating sources 180H2 and 180H1 on the anodes of tubes TCL and TUCA respectively ensures that the former will fire repetitively upon the occurrence of a 45H2 signal at the trigger whereas the latter will similarly respond to a 45H1 signal.

The closure of the individual contacts CLC(2) . . . CLC(17) in consequence of the appropriate work-piece being clamped causes the corresponding indicator diode NCL(2) . . . NCL(17) to flash and when all said contacts are closed the 45H2 signal is transmitted to the triggers of the phase-conscious tubes TCL and TUCA. Tube TCL alone fires and positive pulses corresponding in phase to the 45H2 supply are delivered by the cathode to the trigger circuits of tubes TCLC and TCLRO. Considering the trigger circuit of tube TCLC, this involves a series path incorporating resistors and a rectifier. The latter, in conjunction with the associated capacitor to earth which has a leak resistor across it, now produces a D.C. potential at the trigger of tube TCLC. This potential enables the main gap of the tube to conduct during the positive pulse periods of the 180H1 anode supply, and corresponding positive pulses are therefore produced at the cathode to effect repetitive firing of the isolator diode tubes NCL1 to NCL4. The latter in firing produce positive pulses at leads CL1 to CL4 which correspond in phase to the 45H1 supply. It can be seen that the effect of the circuit stage involving tube TCLC is to produce a change of phase and it will be appreciated that an arrangement of this type could be adapted to produce the opposite change of phase by applying H1 signals to the trigger circuit and 180H2 to the tube anode. Leads CL1 and CL2 are operative on the sequence control circuit (FIG. 1), lead CL4 extends to the start circuit (FIG. 9), while lead CL3 is spare.

Meanwhile the network associated with the trigger circuit of tube TCLRO, which is somewhat similar to that of tube TCLC described above, converts the applied pulsating signal to a D.C. potential at the trigger. Tube TCLRO derives its anode supply over relay CLR and a resistor from the previously mentioned source 190FW which is a pulsating source having +190 v. peaks, derived from the single phase alternating current mains. The D.C. signal at the trigger enables the main gap of the tube to fire for the peaks of the anode supply, so that relay CLR operates, the shunt rectifier being provided to prevent "chattering" of the relay. The contacts (not shown) of the operated relay perform a function which is ancillary to the clamping operation.

When the work-pieces are subsequently unclamped, the opening of contacts CLC(2) to CLC(17) extenguishes all the responding tubes and moreover the relay is released. When contacts UCC(2) to UCC(17) operate as a result of the completion of the unclamping function, the relevant indicator diodes NUC(2) to NUC(17), having source —45H1 at the cathodes, are fired. Moreover, the concurrent application of supply 45H1 to the inputs of the AND circuit by the contacts produces a corresponding output. In this case, pulse repeating tube TUCA, primed in like manner to tube TCL but having supply 180H1 at its anode, is alone responsive to the pulsating trigger signals. The repetitive firing of the tube causes the isolating diodes NUC1 and NUC2 to respond accordingly, so that pulsating signals of phase H1 are produced at leads UC1 and UC2 of which the former extends to the sequence control circuit (FIG. 1), while the latter is spare. Tubes TUCA, NUC1 and NUC2 are extinguished when all or any of the contacts UCC(2) to UCC(17) are opened, the operation of the contacts normally taking place simultaneously.

The use of the type of circuit described with reference to the clamping and unclamping facility, besides making for economies in wiring since it uses alternative phase-displaced signals over a single wire from each signal point, enables signals of one phase to be produced at various outputs by the inclusion of a phase-changing state in association with one of the phase conscious pulse-repeating tubes.

*Unload-Station-Vacant Signalling Circuit (FIG. 4).*—This simple circuit element receives 45H1 pulsating signals over contacts USVC when the unload station of the transfer machine is vacant, and extends them directly to lead USV of the sequence control circuit (FIG. 1), a resistance earth condition normally being present at said lead. Closure of the contacts also results in the flashing of the indicator diode tube NUSV which has its cathode connected to source +45H1.

An identical circuit would also be interposed between lead POL of the sequence control circuit and signalling contacts which are operated when a returned platen is in position on the lowered loading lift.

*Fault Responsive Circuit (FIG. 5).*—On a transfer machine such as that described, the malfunctioning of a signalling device such as a limit switch, due either to a fault in the switch itself or in the operating mechanism, will upset the sequence of machine operation and frequently cause damage. However, by the use of phase-displaced signalling supplies and limit switches arranged in pairs to transmit these signals alternately over single conductors, it is possible, with the Fault Responsive circuit shown in FIG. 5, to detect any dangerous malfunctioning of signalling devices and stop the machine before damage occurs.

To illustrate this, it will be remembered from the description of the sequence control circuit (FIG. 1) that immediately upon the transfer bar having completed its forward movement and operated limit switch TBFC (FIG. 7), the clamping of the work-pieces is initiated. If, due to a fault, limit switch TBFC remains closed when the transfer bar is retracted, then at the instant the bar commences to move forward at the next cycle of machine operation, the work-pieces will be clamped-up out of position and damage will result.

From the Transfer Bar signalling circuit (FIG. 7), however, it will be seen that if, as just described, the limit switch TBFC remains closed while the transfer bar is retracted, then, at the instant the bar operates the Transfer Bar Back limit switch TBBC, the 45H1 and 45H2 pulsating supplies will be coupled together.

Under normal circumstances, the pulse repeating tube TLF (FIG. 5), having its anode supplied from source 180H2, is inoperative even though a pulsating signal 45H1 is always present in the trigger circuit. If however, the suggested fault condition arises, the 45H2 pulses normally occurring in complementary periods with respect to the 45H1 pulses now are also applied to the trigger circuit and are operative, together with the +45 v. trigger priming voltage, in repetitively firing the tube TLF. Thereupon, the rectifier/capacitor network connected to the cathode load produces a D.C. potential at the trigger of tube LPRO and this tube fires due to the 190FW anode supply. The bi-stable relay LFR, for instance of the magnetic locking type, in the anode circuit of the tube therefore operates over the rectifier-shunted left-hand winding and is used to shut-off the machine and institute a suitable alarm. When the fault has been duly cleared, resetting of the relay would be accomplished by momentarily operating the push-button switch RSA to energise the opposition winding.

*Lifts Signalling Circuit (FIG. 6).*—This circuit is in many respects similar to the clamp and unclamp signalling circuit just described. The lift at the loading station LSTN is provided with two signalling contacts LUC and LDC which are closed with the lift in up and down positions respectively. Contacts LUC and LDC are supplied from sources 45H1 and 45H2 respectively and are connected over a common lead to the centralized control panel. The common lead terminates upon the anode circuits of indicator tubes NLD and NLU and upon an input lead of a two-input AND circuit of the conventional type already described. Likewise the two signalling contacts UUC (lift up) and UDC (lift down) relevant to the lift at the unloading station USTN, and supplied from sources 45H1 and 45H2 respectively, are connected to the second input lead of the AND circuit and to the indicator diodes NUD and NUU. The latter tubes, together with tubes NLD and NLU are fed from sources —45H2 and —45H1 respectively and would be mounted on the common display panel to serve for visual monitoring of the signalling contacts.

When both lifts are down as evidenced by the closure of contacts LDC and UDC, source 45H2, connected to the common leads, fires tubes NLD and NUD, while tubes NLU and NUU remain inoperative. Moreover the pulsating signal produces a corresponding signal at the output of the AND circuit which is coupled to the primed trigger circuits of pulse repeating tubes TU and TD. The latter alone, having supply 180H2 at its anode, is caused to fire repetitively, so producing positive pulses at its cathode. The rectifying networks in the trigger circuits of tubes TDC and TLDRO produce a substantially steady potential at the triggers whereby the trigger/cathode gaps of said tubes are fired so as to permit the main gap to conduct in sympathy with the anode sources. The firing of tube TDC, serving as a phase changer, produces positive pulses, corresponding in phase to source 45H1, at the cathode and these are in effect reproduced at leads LD1 and LD2 by the firing of the isolating diodes NDL1 and NDL2. Leads LD1 and LD2 are terminated upon the sequence control circuit (FIG. 1). The firing of tube TLDRO by the full-wave rectified supply 190FW enables relay LDR to be operated. Relay LDR, shunted by a rectifier to prevent chattering, is effective at its contacts (not shown) in performing an ancillary function of the lift control. All the fired tubes are duly extinguished, relay LDR is released and leads LD1 and LD2 are de-energised when contacts LDC and UDC open.

When both lifts are up, the closing of contacts LUC and UUC, in extending supplies 45H1 over the two signalling leads, fire the indicator tubes NLU and NUU fed from the source —45H1, and render the AND circuit operative. Tube TU fires in synchronism with 45H1 supply, whereupon its positive cathode pulses cause the diode tubes NLU1 and NLU2 to respond accordingly so that corresponding pulses in phase with source 45H1 appear at leads LU1 and LU2 which extend to the sequence control circuit and signify the "Lifts Up" condition.

Meantime the steady potential produced at the trigger of tube TLURO by the associated rectifying network enables the tube to fire from the 190FW supply. Therefore, the rectifier-shunted relay LUR operates for the duration of the response of the tube and, like relay LDR, would be concerned in some ancillary function of the lift control. Again the circuit restores to normal upon the opening of contacts LUC and UUC.

*Transfer Bar Signalling Circuit (FIG. 7).*—This circuit is similar in many respects to others described. The transfer bar mechanism which is operative in advancing the work-pieces one step, is arranged to close contacts TBFC and TBBC when in the forward and back (or restored) positions respectively. Contacts TBFC are supplied from the pulsating source 45H1 whereas contacts TBBC are supplied from 45H2. Again both contacts extend to the control panel over a single signalling conductor which terminates upon the anode and trigger circuits of tubes NTBF and TTBF respectively, and which is likewise terminated as regards tubes NTBB and TTBB. The first pair of tubes, by virtue of their —45H1 and 180H1 feeds are responsive only to 45H1 signals applied when contacts TBFC close, whereas the second pair, due to the —45H2 and 180H2 feeds, are responsive to 45H2 signals. The diode tubes NTBF and NTBB which effectively monitor contacts TBFC and TBBC respectively are on the common indicator panel. When contacts TBFC are closed, the firing of the pulse repeating tube TTBF causes the isolator tubes NTBF1 to NTBF4 to fire accordingly, and positive pulses in phase with the 45H1 initiating signal are produced at leads TBF1 to TBF4 which all extend to the sequence control circuit (FIG. 1). The eventual release of contacts TBFC extinguishes the relevant tubes.

Later, when contacts TBBC are closed due to restoration of the transfer bar mechanism, tubes NTBB and TTBB which are sensitive to the applied 45H2 signal proceed to fire. The rectifying arrangement between the cathode of pulse repeating tube TTBB and the trigger of tube TTBBC producing a substantially steady positive potential at said trigger, enables tube TTBBC with its 180H1 anode supply to effect phase displacement as regards the signals at the cathodes of the two tubes. Tubes NTBB1 and NTBB2 fire according to the firing of the tube TTBBC and therefore positive pulses of phase H1 are produced at leads TBB1 and TBB2 which terminate at the sequence control circuit (FIG. 1).

*Cross-Index Signalling Circuits (FIGS. 8A and 8B).*— The former circuit is concerned with the transmission of signals over leads CIB1 to CIB4 when the cross-indexing mechanisms at the loading (LSTN) and unloading (USTN) stations are both in the restored or back positions. Contacts LCBC and UCBC are operated respectively when the cross-index mechanisms appropriate to stations LSTN and USTN respectively are back. Both contacts are supplied from sources 45H1 and extend over individual conductors to a conventional rectifier/resistor AND circuit and to the indicator diodes NLCB and NUCB which have their cathodes connected to the —45H1 supplies. Each contact unit when closed fires the relevant indicator tube and when both are closed, the AND circuit becomes operative to extend effectively the signal to the trigger of the pulse repeating tube TCB which is primed by +45 v. over the resistor/rectifier network. This signal, together with the synchronised 180H1 anode supply, repetitively fires tube TCB, and the isolator tubes NCIB1 to NCIB4 respond after the manner described to produce signals, in phase with source 45H1, at leads CIB1 to CIB4. All these leads, except the last which is spare, feed the sequence control circuit.

As regards FIG. 8B, this is essentially the same as FIG. 8A and serves to extend signals of phase H1 to leads CIF1 and CIF2 of the sequence control circuit, when a returned platen has been cross-indexed to the load station LSTN in readiness for loading and when an unloaded platen has been cross-indexed from the unloading station USTN to the raised unloading lift. These two conditions are represented by the closure of contacts POC and CFC respectively which are both energised from source 45H1. Each contact unit is effective in firing the appropriate indicator diodes NLPO and NUCF, and when both are closed the signals at the two inputs of the AND circuit produce a pulsating output which is operative upon the primed pulse repeater tube TCF. Therefore the isolating diodes NCIF1 and NCIF2 proceed to fire and signals in phase with supply 45H1 appear at leads CIF1 and CIF2.

Again the contact-monitoring diode tubes NLPO and NUCF, like tubes NLCB and NUCB of FIG. 8A, would be mounted on the common indicator panel.

*Start Circuit (FIG. 9).*—Manually operable push-button switches BPB and CPB are provided in the vicinity of the loading and unloading stations. When a work-piece has been secured to the empty platen at the loading station, the so-called B operator presses switch BPB momentarily and likewise the C operator at the unloading station presses switch CPB when a completed work-piece has been removed. Upon the switches being closed, pulsating 45H1 signals are applied individually to the trigger circuits of tubes TBP and TCP which are to serve as memory devices. With relay contacts BSR4 unoperated as shown, the anodes of these tubes are supplied, by way of other contacts signified by the X, from +165 v., the resistor to earth being included for contact wetting purposes. Moreover with contacts SFR1 of the alarm relay SFR unoperated, the triggers of tubes TBP and TCP are primed by a stabilized +45 v. supply derived from the diode tubes NB1 and NB2 connected in series with individual resistors between +105 v. and earth. Tubes TS and TSA are primed in a similar manner from diodes NB3 and NB4.

Under normal circumstances, therefore, the potentials at tubes TBP and TCP enable the relevant tube to be fired and sustained individually when a 45H1 signal is applied to the trigger circuit. The cathodes of tubes TBP and TCP extend to the trigger of tube TBC over a resistor and rectifier respectively, the sense of the rectifier being such that only when both tubes TBP and TCP have been rendered conducting is the potential at said trigger sufficiently positive to fire the pulse generating tube TBC. The latter, having its anode connected to pulsating source 180H1, produces positive cathode pulses of phase H1 and these are effective in causing isolator tubes NBC1 and NBC2 to apply pulsating signals to leads BC1 and BC2. Lead BC2 terminates on the sequence control circuit (FIG. 1) to start the transfer machine sequence providing all the other necessary conditions are met, whereas lead BC1 is connected within the start circuit to one of the inputs of the AND circuit associated with pulse repeater tube TS.

In addition to the BC1 signal, this AND circuit obtains inputs from (*a*) lead TLS4 of FIG. 2 when all the machine-tool heads are in the top-limit positions, i.e. withdrawn from work-pieces, (*b*) lead CL4 of FIG. 3 when the workpieces are clamped, and (*c*) lead AD1 when a hydraulic power unit concerned in the control of the transfer machine is suitably conditioned. When positive pulsating inputs of phase H1 are present on all the four leads mentioned, the output of the AND circuit enables the primed tube TS to fire repetitively from the 180H1 anode supply. Thereupon, positive pulses, occurring at the cathode, are converted to a steady positive potential by the network comprising rectifier MRSA and the resistor-shunted capacitor CS, the output being connected over a resistor and a capacitor to the trigger circuit of tube TSA and to the negative plate of rectifier MRSB. At this time a pulsating phase H1 signal (having alternate periods of earth and positive potential) is being fed to lead TLP1 from FIG. 2 since the machining heads are in the withdrawn position, the signal being maintained as long as one or more heads remain in that position. The sense of rectifier MRSB connected to lead TLP1 is such that in these circumstances it fully conducts during the earth periods of the TLP1 signal. Positive pulses are therefore produced at the trigger input circuit of tube TSA for the complementary positive potential periods when rectifier MRSB is blocked off. Consequently tube TSA, with anode to 180H1, proceeds to fire repetitively, and the positive pulses now derived from the cathode of tube TSA enable a rectifier/capacitor network to produce a relatively steady positive potential which is applied to the trigger of tube TASRO, so that the latter tube responds to the 190FW supply at its anode. Relay ASR thereupon operates.

Meantime the pulsating output of tube TSA is also fed back over a resistor and a rectifier MRSC to the junction of rectifier MRSA and capacitor CS. This feed-back is important since it enables the D.C. condition to be sustained at said junction, so as to maintain the repetitive firing of tube TSA for as long as lead TLP1 is in the signalling condition even though tube TS may be subequently extinguished by the disabling of its AND circuit. When lead TLP1 reverts to its quiescent condition in which a steady resistance earth potential is applied to it, the capacitor CS discharges and further striking of tube TSA is prevented. Tube TSA nevertheless only continues to fire providing the fault relay contacts SFR1 remain unoperated to maintain the trigger priming potential.

Reverting to the operation of relay ASR, its contacts ASR1 would be effective in operating switching means for starting a first group of machine-tools. Contacts ASR2 remove the shunt from the capacitor in the trigger circuit of tube TBSRO so that the capacitor proceeds to charge. After a prescribed period of say 1.5 sec., the potential at the trigger is raised sufficiently to allow said tube to fire from the 190FW source and accordingly relay BSR operates. Contacts BSR1 would thereupon start a second group of machine-tools, whereas contacts BSR2 initiate the delayed operation of relay CSR through the intermediary of tube TCRSO, the operating circuit being similar to that of the foregoing circuit. Relay BSR is also effective at contacts BSR3 in resetting the bottom limit signalling element of FIG. 2, and at contacts BSR4 in extinguishing tubes TBP and TCP to stop the signals at leads BC1 and BC2. However, as already mentioned tube TSA continues to fire due to the feed-back conditions, so that relay CSR duly operates, whereupon its contacts CSR1 start a third group of machine-tools. The sequential operation of relays ASR, BSR and CSR prevents overloading of the supply-mains feeding the machine-tools.

Relay CSR at contacts CSR2 activates a delay circuit connected to the trigger of tube TSFRO but in the normal course of events, before the delay period of say 5 secs. has matured, all the machine-tool heads will have moved from their top limit positions as evidenced by the removal of the signalling condition from lead TLP1. This disables tube TSA with the result that relays ASR, BSR and CSR release in succession, the latter resetting the delay circuit of tube TSFRO to prevent operation of the fault indicating relay SFR.

The actual operation of the machine tools or unit heads can be arranged to take place in various ways and the following description of a cycle of operation for drilling will indicate by way of example how the various controls operate. Such a machine is provided with two motors known respectively as the FAST FEED and SPINDLE motors. The operation of these motors is controlled by a local contactor panel under the control of one of the relays ASR, BSR and CSR and a group of limit switches. These include the top and bottom limit switches already referred to in connection with the signalling arrangements and also three further switches which may be described as FAST FEED OFF, SPINDLE ON and SPINDLE OFF. The operations which then take place are first of all a fast approach of the drill into contact with the component followed by the actual drilling operation at slow speed and thereafter the return of the drill to its starting position at a fast speed.

To produce this cycle the first operation is that the start signal energises the FAST FEED motor and as soon as the drill starts to move the top limit switch opens. As the drill approaches the work the SPINDLE ON limit switch energises the spindle motor to rotate the drill and provide the necessary slow drilling feed and about the same time the FAST FEED OFF limit switch is operated which causes the cutting off of the FAST FEED motor. When the bottom limit switch operates, this motor is again connected up but in the opposite direction so as to withdraw the drill to its starting position and at about the same time the SPINDLE OFF limit switch causes the cutting out of the spindle motor. When the drill has returned to its starting position, the top limit switch is operated to cut off the FAST FEED motor. The complete cycle of operations has now been performed and the drill is again clear of the work. It will of course be appreciated that various different operations may be performed by the different unit heads and that the time required will not be the same in every case. It will be understood also that though a single drill has been referred to, in many cases it will be possible to make use of a multiple drilling head.

In the event of the TLP1 signal persisting due to a fault condition, the firing of tube TSFRO from the 190FW anode supply would ensue and relay SFR would operate. Under these circumstances contacts SFR2 would be used to initiate an alarm, whereas contacts SFR1 remove the priming potentials from tubes TBP, TCP, TS and TSA to disable them. Tube TSA thereupon releases relays ASR, BSR and CSR, but relay SFR being of a suitable bi-stable type, for instance a known magnetic locking relay, remains actuated even though the left-hand winding is disconnected.

When it is required to reset the start circuit after the fault condition, this is effected by momentarily operating the push-button switch RSPB which energises the right-hand winding and causes the relay to be restored to normal.

We claim:

1. In a signalling system, a first current source producing first rectified half-waves of alternating current and having one pole earthed, a second current source also having one pole earthed and producing second rectified half-waves of alternating current of the same polarity as, but phase displaced 180° from, said first current half-waves, a signalling station, a single-conductor signalling line, a first switch responsive to a first condition at said signalling station, a second switch responsive to a second condition at said signalling station, means operated by said first switch for connecting said first source to said line, means operated by said second switch for connecting said second source to said line, said first and said second switches normally being open to a non-signalling position or normally having only one of said switches closed, coincidence means at the termination of said line receiving said first and said second current half-waves including means marking the position of said first current half-waves and the 180° displacement of the second current half-waves so as to produce an output indicative of the particular switch which has been operated, and indicating means responsive to both said first current half-waves and said second current half-waves when both of said first and said second sources are simultaneously applied thereto.

2. In a signalling system, a first current source producing first rectified half-waves of alternating current and having one pole earthed, a second current source also having one pole earthed and producing second rectified half-waves of alternating current of the same polarity as, but phase displaced 180° from, those from said first source, a signalling station, a single-conductor signalling line, a first switch responsive to a first condition at said signaling station, a second switch responsive to a second condition at said signalling station, means operated by said first switch for connecting said first source to said line, means operated by said second switch for connecting said second source to said line, said first and said second switches normally being open to a non-signalling position or normally having only one of said switches closed, a grid-controlled gas discharge tube, means operable to connect said first source to the grid of said tube, means operable to connect said second source to the anode of said tube, indicating means connected to the output of said tube giving an indication when both of said first and said second sources are simultaneously applied to the grid of said tube, and coincidence means at the termination of said line receiving said first and said second current half-waves, said coincidence means including a pair of gas discharge tubes and means marking the position of said first current half-waves and the 180° displacement of the second current half-waves so as to produce an output indicative of the particular switch which has been operated.

3. In a signalling system, a first current source producing first rectified half-waves of alternating current and having one pole earthed, a second current source also having one pole earthed and producing second rectified half-waves of alternating current of the same polarity as, but phase displaced 180° from, those from said first source, a signalling station, a single-conductor signalling line, a first switch responsive to a first condition at said signalling station, a second switch responsive to a second condition at said signalling station, means operated by said first switch for connecting said first source to said line, means operated by said second switch for connecting said second source to said line, said first and said second switches normally being open to a non-signalling position or normally having only one of said switches closed, first and second grid-controlled gas discharge tubes, means operable to connect the opposite end of said line to the grid of each of said gas discharge tubes, and means marking the position of said first current half-waves and the 180° phase displacement of said second current half-waves, said marking means comprising a third current source having one pole earthed and providing a pulsating potential in electrical phase coincidence with said first current half-waves, means operable to connect said third source to the anode of said first tube, a fourth current source having one pole earthed and providing a pulsating potential in phase coincidence with said second current half-waves, and means operable to connect said fourth source to the anode of said second tube, so that said first tube or said second tube is struck, respectively, when said first switch or said second switch has been operated.

4. In a signalling system, a first current source producing first rectified half-waves of alternating current and having one pole earthed, a second current source also having one pole earthed and producing second rectified half-waves of alternating current of the same polarity as, but phase displaced 180° from, said first current half-waves, a signalling station, a single-conductor signalling line, a first switch responsive to a first condition at said signalling station, a second switch responsive to a second condition at said signalling station, means operated by said first switch for connecting said first source to said line, means operated by said second switch for connecting said second source to said line, said first and said second switches normally being open to a non-signalling position or normally having only one of said switches closed, a first grid-controlled gas discharge tube, means operable to connect the distant end of said line to the grid of said first gas discharge tube, a second grid-controlled gas discharge tube, means operable to connect the distant end of said line to the grid of said second tube, and means marking the position of said first current half-waves and the 180° displacement of the second current half-waves, said marking means including means connecting said first source to the anode of said first tube and means connecting said second source to the anode of said second tube, so that either said first tube or said second tube is struck, dependent upon whether said first switch or said second switch has been operated.

5. In a signalling system as claimed in claim 4, a central control panel at the distant end of said single-conductor signalling line and means visually indicating at said panel the signals being transmitted over said line, said indicating means comprising a pair of gas discharge diodes each having an anode connected to said line, a third current source providing rectified half-waves of alternating current in phase with said first current half-waves but of opposite polarity thereto connected to the cathode of one of said diodes, and a fourth current source providing rectified half-waves of alternating current in phase with said second half-waves and of opposite polarity connected to the cathode of the other one of said diodes.

6. In a signalling system as claimed in claim 4, a plurality of output control leads, isolating means operable to connect a selected number of said output control leads to said first tube only when the latter is struck, and isolating means operable to connect the rest of said control leads to said second tube only when it is struck, said isolating means comprising a gas discharge diode member connected serially within each of said control leads which strikes only when its associated tube conducts and which otherwise prevents effective electrical connection with the other control leads.

7. In a signalling system as claimed in claim 4, means operable to store a momentary signal comprising a third grid-controlled gas discharge tube, a source of pulsating current connected to the anode of said third tube, means applying a first control voltage to the grid of said third tube, means additionally applying a second control voltage to said grid, said first control voltage being insufficient in the absence of said second control voltage to enable said third tube to strike, said first and said second control voltages together causing said third tube to strike, and feedback means connected between the cathode and the grid of said third tube for duplicating the effect of said second control voltage so that said third tube continues to conduct after the removal of said second voltage for as long as said first voltage persists.

8. In the signalling system claimed in claim 4, means operable to store a momentary signal comprising a third grid-controlled gas discharge tube, a relay having normally-closed contacts, means applying a constant potential to the anode of said third tube through said relay contacts, means coupling said momentary signal to the grid of said third tube to cause the latter to strike, means responsive to the striking of said third tube operable to prepare a circuit to actuate said relay, and means subsequently completing said relay actuating circuit to open said normally-closed contacts and thus extinguish said third tube.

9. In a control system for an installation incorporating an intermittently-operated conveyor device for automatically performing a sequence of operations on workpieces, which operations are performed successively at a plurality of different stations, a first current source producing first rectified half-waves of alternating current and having one pole earthed, a second current source also having one pole earthed and producing second rectified half-waves of alternating current of the same polarity as, but phase displaced 180° from, those from said first source, a first switch responsive to a first condition and a second switch responsive to a second condition at each of said stations, a control position, a plurality of single-conductor signalling leads extending, respectively, from each of said stations to said control position, means controlled by the first switch of each station for connecting said first source to the corresponding lead, means controlled by the second switch of each station for connecting said second source to the corresponding lead, the first and the second switches at each station normally being open to a non-signalling position or normally having only one switch at any given station closed, and coincidence means at said control position connected to said signalling leads and responsive to signals over all of said leads to initiate a control operation for said conveyor device only when signals indicating completion of the performance of an operation have been received from all of said stations.

10. In the control system claimed in claim 9, an electromagnetically operated stepping switch including first and second movable wipers, first and second contact banks for said wipers, a driving magnet for said stepping switch controlled by said second wiper and said second contact bank, means connected to the contacts of said first bank operable to control the operation of said conveyor device, and means responsive to said coincidence means, to selectively apply control signals to the contacts of said second bank, so that the stepping operation of said stepping switch by energizing said magnet depends upon receiving signals indicating that all the operations corresponding to the particular position of said conveyor device have been successfully completed.

11. In a system as claimed in claim 10, means responsive to both said first and said second current sources operable to control the stepping of said stepping switch and means converting half-waves from said first source to the phase relation of half-waves from said second source, said converting means comprising a gas discharge tube including an anode, a cathode and a control grid, a rectifier-capacitor circuit connected to said control grid, means operable to apply half-waves from said first source to said rectifier-capacitor circuit, means operable to apply half-waves from said second source to the anode of said tube and an output circuit connected to said cathode.

12. In a control system for an installation incorporating an intermittently-operated conveyor device for automatically performing a sequence of operations on workpieces, which operations are performed successively at a plurality of different stations, a first current source producing first rectified half-waves of alternating current and having one pole earthed, a second current source also having one pole earthed and producing second rectified half-waves of alternating current of the same polarity as, but phase displaced 180° from, those from said first source, a first switch responsive to a first condition and a second switch responsive to a second condition at each of said stations, a control position, a plurality of single-conductor signalling leads extending, respectively, from each of said stations to said control position, means controlled by the first switch of each station for connecting said first source to the corresponding lead, means controlled by the second switch of each station for connecting said second source to the corresponding lead, the first and the second switches at each station normally being open to a non-signalling position or normally having only one switch at any given station closed, first coincidence means at said control position connected to said signalling leads and responsive to said first current half-waves over all of said leads to initiate a first control operation for said conveyor device, and second coincidence means at said control position also connected to said leads and responsive to said second current half-waves over all of said leads to initiate a second control operation for said conveyor device.

References Cited in the file of this patent
UNITED STATES PATENTS

| | | |
|---|---|---|
| 1,617,935 | Affel et al. | Feb. 15, 1927 |
| 2,153,178 | Fitch | Apr. 4, 1939 |
| 2,209,883 | Gohorel | July 30, 1940 |
| 2,610,243 | Burkhart et al. | Sept. 9, 1952 |
| 2,676,245 | Daelz | Apr. 20, 1954 |
| 2,717,371 | Bruene | Sept. 6, 1955 |
| 2,759,177 | Hightower | Aug. 14, 1956 |

FOREIGN PATENTS

| | | |
|---|---|---|
| 429,783 | Great Britain | June 6, 1935 |

OTHER REFERENCES

Publication, Principles and Methods of Telemetering, by Borden et al. (TK 399 B6), date 1948, Reinhold Publishing Corp. New York, pp. 122 and 123.